United States Patent [19]

Remmers

[11] Patent Number: 4,858,585
[45] Date of Patent: Aug. 22, 1989

[54] ELECTRONICALLY ASSISTED ENGINE STARTING MEANS

[75] Inventor: Gregry M. Remmers, Ingleside, Ill.

[73] Assignee: Outboard Marine Corporation, Waukegan, Ill.

[21] Appl. No.: 131,457

[22] Filed: Dec. 11, 1987

Related U.S. Application Data

[63] Continuation of Ser. No. 12,336, Feb. 9, 1987, abandoned.

[51] Int. Cl.$^4$ ............................................... F02P 3/00
[52] U.S. Cl. .................................. 123/602; 123/427; 123/179 BG
[58] Field of Search ............... 123/602, 427, 424, 415, 123/479, 179 B, 179 BG

[56] References Cited

U.S. PATENT DOCUMENTS

| | | | |
|---|---|---|---|
| 3,768,451 | 10/1973 | Okamodo | 123/415 |
| 3,805,759 | 4/1974 | Fitzner | 123/602 |
| 3,923,023 | 12/1975 | Ito et al. | 123/407 |
| 3,952,715 | 4/1976 | Van Sichen, Jr. | 123/602 |
| 4,133,325 | 1/1979 | West | 123/427 |
| 4,306,535 | 12/1981 | Fitznor | 123/602 |
| 4,331,880 | 5/1982 | Dittmann et al. | 123/179 BG |
| 4,377,138 | 3/1983 | Mitani et al. | 123/179 B |
| 4,412,137 | 10/1983 | Hanson et al. | 123/179 B |
| 4,432,325 | 2/1984 | Auracher et al. | 123/424 |
| 4,444,168 | 4/1984 | Matsumura et al. | 123/179 B |
| 4,454,843 | 6/1984 | Uchida et al. | 123/179 BG |
| 4,458,646 | 7/1984 | Suzuki et al. | 123/424 |
| 4,490,620 | 12/1984 | Hanson | 123/179 BG |
| 4,612,899 | 9/1986 | Honjoh et al. | 123/602 |
| 4,633,834 | 1/1987 | Takauchi et al. | 123/602 |
| 4,644,927 | 2/1987 | Okuda | 123/602 |

Primary Examiner—R. R. Nelli
Attorney, Agent, or Firm—Welsh & Katz, Ltd.

[57] ABSTRACT

An improved engine ignition system for a marine engine or the like, which provides reliable start-up capability and running protection. The system detects the actual rotational speed of the engine and provides an electrical signal that is proportional to the measured speed, and selectively advances the ignition timing characteristic, and also controls overall engine speed to prevent engine damage that may be caused by an overspeed condition. The system advances the ignition timing characteristic during warm-up until a predetermined temperature is achieved, and also advances the ignition timing characteristic for a predetermined time period during initial running. The system utilizes the power of the battery during start-up to supplement the power that is generated by the stator coil which normally supplies all of the necessary power for the control circuitry of the ignition system.

44 Claims, 1 Drawing Sheet

ELECTRONICALLY ASSISTED ENGINE STARTING MEANS

This is a continuation of application Ser. No. 012,336, filed Feb. 9, 1987, now abandoned.

The present invention generally relates to an electronically assisted combustion engine ignition system, and more particularly to an improved system for a marine engine, such as an outboard marine engine.

The present invention provides an improved ignition system in that improved starting and other desirable operational characteristics are obtained. The present invention not only produces the improved operational characteristics that are described, but accomplishes such functionality by utilizing a circuit design that comprises a relatively few number of circuit components compared to ignition systems that may have some comparable features to those disclosed herein. Moreover, the functionally desirable attributes of the present invention are achieved utilizing a circuit design which is elegant in its simplicity, but which is expansive in terms of its functionality and purpose.

Prior art outboard engines often utilize various means for accomplishing easier starting. For example, such prior art engines may engage a "warm-up" lever which manually advances the spark timing and partially opens the carburetor throttle plates. The function of such an arrangement is to increase the running speed of the motor when it is started.

While prior art engine ignition systems have utilized various means to selectively advance the ignition timing characteristic during operation, such systems are not adapted to selectively change the timing characteristic as a function of the temperature of the engine during its warm-up phase, as well as during a predetermined time period regardless of the temperature of the engine, and as a function of the operating speed of the engine, particularly when operated at a relatively high speed.

The present invention accomplishes the above improved operating characteristics utilizing an electronic circuit that comprises fewer circuit components and a circuit design that is unique in its implementation of the desired functionality that is achieved.

Accordingly, it is an object of the present invention to provide an improved ignition system for an internal combustion engine, such as an outboard marine engine or the like, which provides multiple functions that improve the operation of the engine, as well as protect the engine during start-up and subsequent operation of the engine.

It is another object of the invention to provide such an improved ignition system that promotes reliable starting and smooth running. It is still another object of the invention to provide such an improved ignition system that provides overspeed protection after start-up.

Still another object of the present invention is to provide an improved ignition system which utilizes well known and available circuit elements to provide the above described functional capabilities in an extremely reliable manner.

A more detailed object of the present invention is to provide an improved ignition system which utilizes a means for accurately detecting the actual rotational speed of the engine crankshaft and provide an electrical signal that is proportional to the measured speed, and thereafter control the selective advance of the ignition timing characteristic, as well as to control overall engine speed to prevent engine damage that may be caused by an overspeed condition.

Yet another detailed object of the present invention is to provide an improved ignition system which utilizes a signal that is proportional to the measure speed of the engine and couple such a signal with signals representing other measured values to selectively advance the ignition timing characteristic to accomplish all of the above described functional operational characteristics of: (1) providing protection against damage that may be caused by a runaway speed condition; (2) providing a desired spark advance during warm-up of the engine; (3) providing desired spark advance during initial start-up, irrespective of the temperature of the engine, i.e., even if the engine were warm as a result of having been previously operated; and, (4) providing protection against damage that may be caused by advancing the timing characteristic while operating the engine above a predetermined operating speed.

Still another object of the present invention is to provide an improved ignition system which helps insure start-up of the engine by utilizing the power of the battery to supplement the power that is generated by the stator coil which normally supplies all of the necessary power for the control circuitry of the ignition system. Since the voltage from the starter solenoid is used during starting as a control signal by the ignition system, benefit is achieved by making use of the power that is present to supplement the power produced by the power supply circuitry for energizing the ignition system control circuitry, thereby insuring proper operation of the ignition system and engine during startup.

Other objects and advantages will become apparent upon reading the following detailed description, while referring to the attached drawings, in which:

DETAILED DESCRIPTION OF THE INVENTION

Broadly stated, the present invention relates to an ignition system for an internal combustion engine, such as an outboard engine for marine use or the like, which has superior operational characteristics. The ignition system disclosed utilizes commercially available and commonly known circuit components and combines such components in an elegantly simple and superbly designed circuit that results in superior operational characteristics, while utilizing a minimum number of circuit elements.

The ignition system of the present invention is adapted to function with portions of a capacitive discharge ignition system that are well known and refined over many years and are proven to be reliable. However, the present invention provides improved safeguards and protection against damage that could result from a runaway overspeed condition as well as damage that could result from advancing the ignition timing characteristic when operating the engine above a predetermined speed, such as about 1500 r.p.m., for example. The present invention provides for automatic advance of the timing characteristic during startup and until smooth operation is achieved, which aids in starting and in the initial operation. In this regard, the advance is automatically invoked for a short time period during initial operation regardless of the temperature of the engine, i.e., even though the engine may have been running and was warm, and also advances the ignition timing characteristic when the engine is started cold and maintains the advance in effect until the engine reaches a warmup temperature within the range of about 80 to about 90 degrees F. However, the advance is inhibited if the operating speed reaches the predetermined speed threshold as just described.

While the present invention is particularly adapted for use with outboard marine engines, as well as other marine engines, it certainly is not limited to applications involving only marine use. Also, while the detailed description of the invention describes specific circuitry to accomplish the operation of the system, it should be understood that circuit functionality may be accomplished by using similar components that may operate using different voltage levels, or different components to provide the same function. Logic circuit elements can have a "true" output that may be a voltage high or low, for example, and the circuit could be modified to accomplish to same function.

Figure 1:
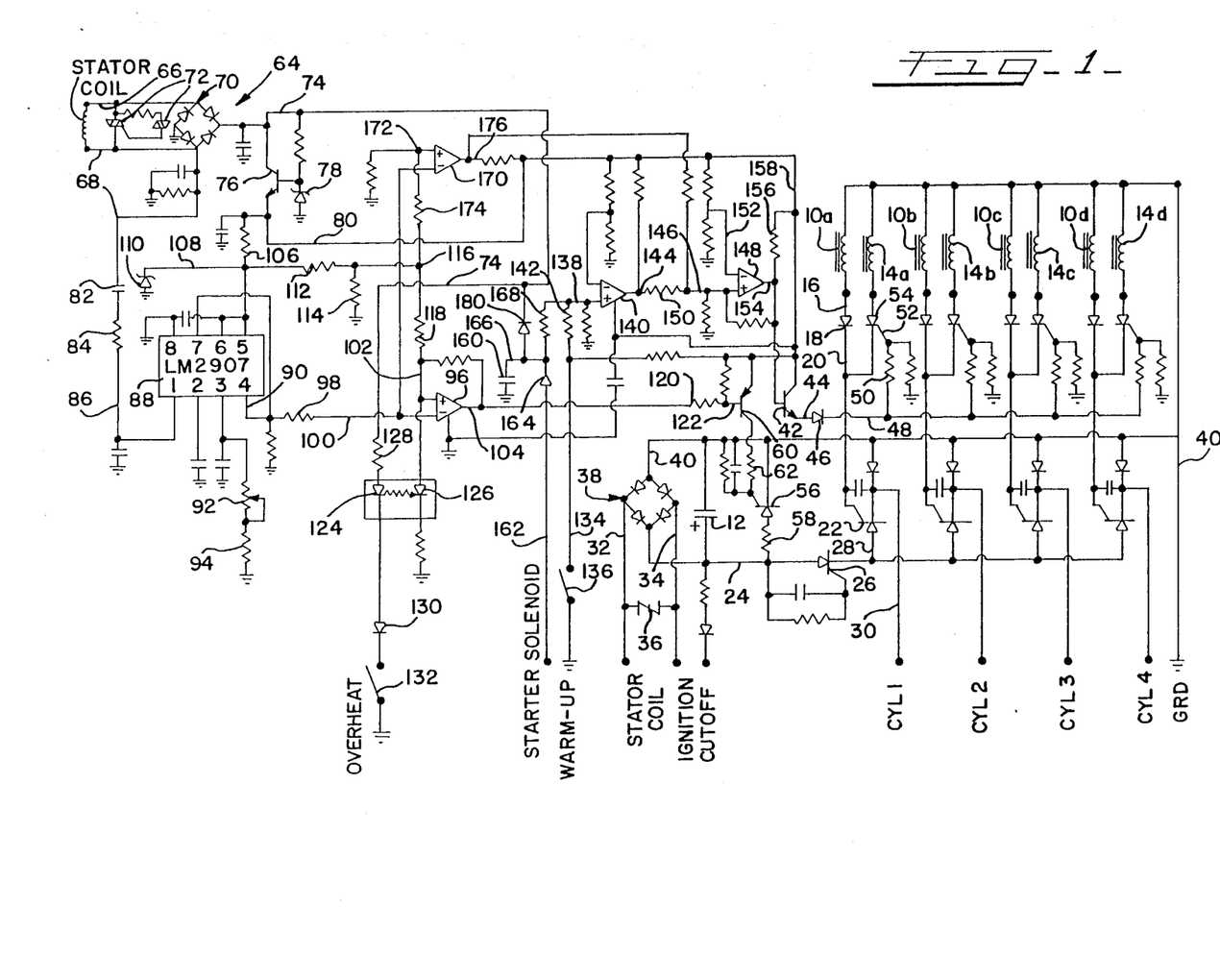
FIG. 1 is a electrical schematic diagram of the ignition system of the present invention.

Turning now to the drawing, a conventional timer base for triggering the discharge of the ignition capacitor is shown at the upper right of the drawing and includes a number of coils 10a, 10b, 10c and 10d (for a four cylinder engine) and cooperate with a magnet (not shown) preferably located on the flywheel for inducing a voltage in the respective coils for discharging an ignition capacitor 12 as the engine operates to produce the normal ignition timing characteristic. There are also a number of coils 14a, 14b, 14c and 14d that are provided to produce an advanced ignition timing characteristic, and this is achieved by placing the respective coils 14 ahead of the coils 10 by a predetermined angle, preferably about 10 degrees. If the ignition system has the advance coils 14 in operation, the timing characteristic is advanced by the predetermined angle inasmuch as the coils 14 will trigger the discharge of the ignition capacitor rather than the coils 10.

The capacitive discharge ignition portion of the circuitry operates identically with respect to each of the cylinders that may be present in the engine. In the disclosed embodiment, there are four cylinders; the circuitry for only one of the cylinders will be described. When coil 10a is passed in proximity to the magnet, a voltage is induced in coil 10a which applied to line 16, through diode 18 to line 20 and is applied to the gate of an SCR 22, triggering it into conduction and discharges the previously charged ignition capacitor through a line 24, an SCR 26, a line 28, the SCR 22, a line 30 to the spark plug of cylinder No. 1. The ignition capacitor 12 is charged by a stator coil (not shown) connected through lines 32 and 34, a Sidac 36 and diode bridge 38, one side of which is connected to the capacitor 12 by a line 40, the other being connected to the capacitor by line 24.

To provide the advanced timing characteristic, the coils 14 are enabled, and by virtue of their position being angularly advanced relative to the coils 10, trigger the discharge of the ignition capacitor by approximately 10 degrees relative to the coils 10. This is accomplished by a switching transistor 42 being switched into conduction by the control circuitry portion of the present invention. When transistor 42 is switched into conduction, current flows through a line 44, diode 46, a line 48, a resistor 50, a line 52, which is connected to the gate of a SCR 54 and switches it on, which places coil 14a (as well as the other coils 14) into operation so that coils 14 trigger the discharge, rather than coils 10. Thus, when transistor 42 is conducting, the coils 14 which provide the advanced timing characteristic are placed in operation. When transistor 42 is switched off, the ignition system returns to its nonadvanced timing characteristic.

In accordance with the present invention, the control circuitry portion of the present invention operates to cut out the ignition system so that damage will not be done to the engine. This is done by preventing the ignition capacitor 12 from charging. By preventing charging of the capacitor 12, the overall engine speed can be controlled. In the preferred embodiment disclosed, this is accomplished by a SCR 56 and a resistor 58 connected in series across the capacitor 12 by lines 24 and 40. When SCR 56 is switched into conduction, the ignition capacitor is shunted to ground, and is therefore prevented from charging and cannot provide energy to the spark plug when triggered by the coils 10 or 14.

The SCR 56 operation is controlled by a switching transistor 60 having its collector connected to the gate of SCR 56 through a resistor 62. When the transistor 60 is switched into conduction, the SCR 56 is switched into conduction, which shunts the capacitor 12 and prevents it from charging.

The power supply of the present invention, indicated generally at 64, includes lines 66 and 68, which are connected to a diode bridge 70, with a diac 72 connected between lines 66 and 68, and provides a 20 volt output on line 74, which is regulated by transistor 76 and zener diode 78 as shown, to provide a regulated 12 volt supply on line 80. The stator coil produces 6 pulses on line 68 for each revolution of the flywheel and thereby provides a tachometer pulse on line 68 which is applied through a capacitor 82, resistor 84 and line 86 to pin 1 of a frequency to voltage convertor 88. The convertor 88 has an output line 90 that has a voltage level that is directly proportional to the frequency of the pulses that are applied to its input on line 86. A variable resistor 92 and resistor 94 define a voltage bridge that varies the level of the output voltage level that is produced on the output line 90.

In accordance with an important aspect of the present invention, the circuitry provides protection against a run-away speed condition occurring during operation of the engine. This is accomplished by the convertor 88 providing a voltage level on line 90 that is utilized to switch the transistor 60 into conduction and shunt the ignition capacitor 12. This is accomplished by the voltage on line 90 being connected to one input of a comparator 96 through resistor 98 and line 100. The other input 102 comprises the reference voltage against which the input on line 100 is compared, and the output line 104 of the comparator 96 goes low (or approximately 0 volts) when the voltage on input line 100 is greater than the reference voltage on line 102. In an operating condition that does not represent an overheat condition, the voltage level on line 102 is designed to be approximately 5 volts.

This voltage is supplied by the power supply through voltage reducing circuitry that will now be described. The voltage level on line 80 has been previously described as being approximately 12 volts. Line 80 is connected through a resistor to a line 108 that is connected to a zener diode 110 and a regulated voltage of approximately 9 volts is applied on line 108. The line 108 is connected to a resistor 112, which in cooperation with a resistor 114, functions as a voltage divider and provides a voltage of approximately 5 volts on a line 116. Line 116 is connected to the line 102 through a resistor 118, and applies a voltage of approximately 5 volts to the reference voltage input of the comparator 96. The output line 104 of the comparator 96 is connected to the base of the transistor 60 via a resistor 120 and line 122.

During operation, the convertor 88 produces a voltage on output line 90 that is applied to one input of the comparator 96. When the speed reaches a speed of approximately 6000 r.p.m., the comparator 96, comparing a reference voltage of approximately 5 volts, produces a low voltage on output line 104 that results in transistor 60 switching on, thereby shunting ignition capacitor 12 and limiting the speed of the engine. Protection against a run-away speed condition is provided by a relatively few number of circuit components.

It should be understood that the shunting of the ignition capacitor 12 may occur for incremental short periods of time and on a frequent basis. If the speed is close to the run-away speed condition, as soon as the overspeed conditions is detected, the shunting will occur and the speed will quickly drop. When the operating speed drops below the detected threshold, the transistor 60 will be switched off, and the ignition capacitor will no longer be shunted. Thus, as a practical matter, the engine speed may be modulated around the threshold speed that triggers the comparator 96.

In accordance with another important aspect of the present invention, the maximum speed of operation is reduced from approximately 6000 r.p.m. to about 2500 r.p.m. if an overheat condition is detected. This is accomplished using the same comparator 96 in combination with temperature sensing circuitry. In this regard, a light emitting diode (LED) 124 is optically coupled to a opto-SCR 126. The LED 124 is connected to a 20 volt supply on line 74 through a resistor 128, and to ground through a diode 130 and an overheat temperature switch 132. The switch 132 is positioned to sense the engine temperature and is adapted to close at a temperature of about 212 degrees F. When the switch 132 is closed, LED 124 is turned on, placing opto-SCR into conduction. This then lowers the reference voltage applied to the reference terminal of the comparator 96 to a level of approximately 2.3 volts. The lower reference results in a low output being produced on line 104 at a lower operating speed, as is intended. In operation, when an overheat condition is detected, the comparator 96 switches low at an operating speed of about 2500 r.p.m., and thus shunts the ignition capacitor to limit the speed as previously described, although at a speed of about 2500 r.p.m. rather than about 6000 r.p.m.

The nature of the operation of the opto-SCR is such that it will not be turned off until power is removed from the circuit, and this will not occur until the engine is turned off. This feature is desirable in that it prevents the circuitry from cycling on and off at or about the critical overheat temperature.

Another important attribute of the present invention lies in the provision of automatically providing an advance in the timing characteristic when the engine is initially started and until the engine reaches a predetermined minimum warm-up temperature. This is accomplished by circuitry that controls the switching of the transistor 42. With respect to the warm-up aspect of the circuit operation, a line 134 is connected to a warm-up switch 136 to ground, and switch 136 closes when the sensed engine temperature exceeds a temperature within the range of about 80 to about 90 degrees F. The line 134 is normally high, but goes low when the engine warms up sufficiently to close the switch 136. The line 134 is connected to the comparing input line 138 of a comparator 140 through a resistor 142. Comparator 140 provides a high output on line 144 when input line 138 is high. The line 144 is connected to an input line 146 of an AND gate 148 via resistor 150. The other input line 152 to AND gate 148 is normally high until a predetermined speed is reached by the engine as will be subsequently described, and the AND gate provides a high output on line 154 when input lines 146 and 152 are high. The line 154 is connected to the base of transistor 42 and to the collector thereof via a resistor 156 and a line 158. When the AND gate output is high, the transistor 42 is switched into conduction, which activates the advanced timing characteristic as has been previously described. From the foregoing, it should be understood that the engine will be operated in the advanced timing characteristic until the engine warms up to an operating temperature of about 80 to about 90 degrees. When switch 136 closes, the input 138 will be pulled low, thereby switching comparator 140 low and producing operation in the normal nonadvanced ignition timing characteristic.

As previously described, the engine will also operate in its advanced timing characteristic for a short predetermined time period after initial start-up, i.e., for approximately 5 to 10 seconds, regardless of the temperature of the engine. This is accomplished by having the starter solenoid (not shown) apply a voltage to charge a capacitor 160 via a line 162, a diode 164 and a line 166. The line 166 is connected to the input line 138 to the comparator 140 via resistor 168. Upon starting of the engine the starter solenoid will charge the capacitor 160 which will provide a high level on input line 138 and place the engine in the advanced timing characteristic mode of operation for the time period required to discharge the capacitor to a level where the comparator 140 is switched low. In the illustrated embodiment, this is preferably about 7 seconds, although the circuit components can be chosen to provide a longer or short time period if desired.

In accordance with yet another important aspect of the present invention, provision is made to automatically inhibit the advanced timing characteristic if the operating speed of the engine exceeds a predetermined level of approximately 1500 r.p.m. in the preferred embodiment. Operating the engine with the ignition advanced above this speed could result in damage to the engine.

To inhibit the advanced timing characteristic, the convertor output 90 is connected to the comparing input 100 of a comparator 170, the reference input 172 of which is connected to line 116 via a resistor 174. The reference voltage is chosen to cause the comparator to have its output line 176 switched low when the comparing voltage increases to a level to switch the comparator at an operating speed of approximately 1500 r.p.m. When output line 176 is low, it removes a high voltage applied to the AND gate 148, thereby causing it to switch and provide a low output which switches transistor 42 off and removes the engine from its advance timing characteristic mode of operation. Thus, the circuitry always prohibits operation in an advanced timing mode above approximately 1500 r.p.m., even if the engine is not warmed up or exceeds a running speed of 1500 r.p.m. within the time period of approximately 7 seconds.

From the foregoing description of the circuitry of the present invention, it is apparent that the power for operating the control circuitry is obtained from the stator coil inducing a voltage that is regulated to power the circuitry. During initial start-up, the cranking speed may not be sufficient to provide reliable voltage levels to insure reliable circuit operation. Provision is made to supplement the output of the power supply with power supplied from the starter solenoid during cranking. This is accomplished by coupling the starter solenoid voltage on line 162 to line 74 via the diode 164, line 166 and a diode 180.

An ignition system for an internal combustion engine has been described which has many desirable positive features in terms of its design and operation. Many attributes of the system are carried out using a circuit design that utilizes a relative conservative number of components and yet performs many desirable functions.

It is of course understood that although preferred embodiments of the present invention have been illustrated and described, various modifications thereof will become apparent to those skilled in the art and, accordingly, the scope of the present invention should be defined only by the appended claims and equivalents thereof.

Various features of the present invention are set out in the appended claims.

What is claimed is:

1. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic said trigger pulse generating mean providing said second timing characteristic in response to an advance signal being applied thereto;

means for selectively generating an advance signal for application to said trigger pulse generating means, said advance signal generating means producing said advance signal responsive to an enabling signal being received, but being precluded from producing said advance signal responsive to an inhibiting signal being received;

means for producing an enabling signal for application to said advance signal generating means to generate said advance signal for a predetermined time period after startup of the engine, and also for producing said enabling signal in response to a first engine temperature signal being received, said first engine temperature signal being produced in response to the engine temperature not exceeding a first predetermined sensed level;

means for producing an engine operating speed signal indicative of the speed of the engine;

means for generating an inhibit signal in response to an engine speed signal indicative of an engine operating speed exceeding a first predetermined speed being received;

means for disabling the ignition capacitor charging means in response to an ignition capacitor disabling signal being received;

means for producing an ignition capacitor disabling signal in response to a second engine temperature signal being produced in response to the engine temperature exceeding a second predetermined sensed level and in response to an engine speed signal indicating an operating speed exceeding a second predetermined level being produced.

2. A system as defined in claim 1 wherein said trigger pulse generating means includes first and second trigger coils associated with each cylinder of the engine, the coils being adapted to produce trigger signals in response to passing in operative proximity to a magnet attached to the flywheel of the engine, the first coils associated with the respective cylinders producing the first timing characteristic and the second coils associated with the respective cylinders producing the second timing characteristic, said trigger pulse generating means including a switching means adapted to enable said second coils when said advance signal is applied thereto, the operation of said second coils effectively disabling the operation of said first coils to thereby produce said second timing characteristic.

3. A system as defined in claim 2 wherein said switching means including a SCR connected in series with each of said second coils, the gate of each of said SCR's being connected to receive said advance signal and switch said SCR's into conduction.

4. A system as defined in claim 1 wherein said second timing characteristic is advanced approximately 10 rotational degrees relative to said first timing characteristic.

5. A system as defined in claim 1 wherein said operating speed signal producing means comprises a frequency to voltage convertor having an input operatively connected to a tachometer associated with the engine that is adapted to provide pulses at a frequency proportional to the operating speed of the engine, said convertor producing a voltage at an output having a magnitude that is proportional to the frequency of tachometer pulses that are applied to the input thereof.

6. A system as defined in claim 5 wherein said ignition capacitor charging disabling means includes second switching means connected in parallel across said ignition capacitor and adapted to shunt said ignition capacitor to prevent charging thereof when switched on, and first comparator means being adapted to receive said engine operating speed indicating signal and said second engine temperature signal, said first comparator means having its output operatively connected to said second switching means and adapted to switch on the same in response to receiving said second engine temperature signal or an engine operating speed signal indicative of said speed exceeding said second predetermined level.

7. A system as defined in claim 6 including an opto SCR comprising a light emitting diode (LED) connected to a temperature sensing switch adapted to switch into conduction and energize said LED when the sensed engine temperature exceeds said second predetermined level, said LED being optically coupled to a light sensitive SCR to switch said SCR on when said LED is energized, said SCR being connected to the reference terminal of said first comparator and providing a first reference voltage thereto when nonconducting and a second lower reference voltage when conducting.

8. A system as defined in claim 7 wherein said first comparator means has a reference voltage terminal and a comparing terminal, said reference voltage terminal having a lower reference voltage applied thereto when said light sensitive SCR is conducting, said comparing terminal being connected to said convertor output.

9. A system as defined in claim 1 wherein said first predetermined speed is about 1500 r.p.m.

10. A system as defined in claim 1 wherein said second predetermined speed is about 6000 r.p.m.

11. A system as defined in claim 1 wherein said first predetermined temperature is within the range of about 80 to about 90 degrees F.

12. A system as defined in claim 1 wherein said second predetermined temperature is about 212 degrees F.

13. A system as defined in claim 2 wherein said advance signal generating means comprises a switching semiconductor having an output connected to each of said first switching means and adapted to switch on the same when said switching semiconductor is switched on.

14. A system as defined in claim 13 herein said enabling signal producing means comprises a delay means and a second comparator means having first and second inputs, and an output operatively connected to said switching semiconductor, the first input having a reference voltage applied thereto, and the second input being connected to said delay means and to a mean for producing said first engine temperature signal, said second comparator producing said enabling signal for said predetermined time period or for the duration of the receipt of the first engine temperature signal.

15. A system as defined in claim 14 wherein said second comparator means is an OR gate producing a high output as long as said second input is high, said second input being high for at least said predetermined time period and until said first engine temperature signal is no longer present.

16. A system as defined in claim 14 wherein said delay means comprises a capacitor connected to be charged by a starter solenoid through a diode, said capacitor being connected to said second input of said second comparator means through a resistor, said capacitor providing a high voltage to said second input until discharged sufficiently to switch said comparator means after said predetermined delay.

17. A system as defined in claim 14 wherein said inhibiting signal producing means comprises:
a third comparator having two inputs and an output, one of said inputs being connected to a reference voltage, the other input being operatively connected to said convertor, the output being connected to one input of an AND gate means, said third comparator producing a high output signal until said convertor applies a high signal at said other input indicating the engine operating speed has exceeded said first predetermined speed, and
an AND gate means having at least two inputs and an output, said output being connected to said switching semiconductor, one of said inputs being connected to the output of said second comparator means, the other of said inputs being connected to the output of said third comparator means, said AND gate switching off said switching semiconductor when one or more of said inputs is low.

18. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:
trigger pulse generating means for producing trigger pulses in synchronism with the engine, said trigger pulse generating means being adapted to provide a first timing characteristic for discharging said ignition capacitor means and a second timing characteristic that is advanced a predetermined time relative to said first timing characteristic, said trigger pulse generating means providing said second timing characteristic in response to an advance signal being applied thereto;
means for producing a signal proportional to the operating speed of the engine;
means for selectively generating an advance signal for application to said trigger pulse generating means, said advance signal generating means producing said advance signal only when enabled;
means for enabling said advance signal generating means for a predetermined time period after startup of the engine, said enabling means also enabling said advance signal generating means until the receipt of a signal indicative of the sensed engine temperature reaching a first predetermined level;
means for prohibiting the enabling of said advance signal generating means in response to said operating speed signal indicating the engine is being operated above a first predetermined speed; and
means for at least intermittently disabling the ignition capacitor charging means in response to an engine temperature signal being produced in response to the engine temperature exceeding a second predetermined sensed level or in response to receiving a signal indicative of said engine speed exceeding a second predetermined level.

19. A system as defined in claim 18 wherein said trigger pulse generating means includes first and second trigger coils associated with each cylinder of the engine, the coils being adapted to produce trigger signals in response to passing in operative proximity to a magnet attached to the flywheel of the engine, the first coils associated with the respective cylinders producing the first timing characteristic and the second coils associated with the respective cylinders producing the second timing characteristic, said trigger pulse generating means including a switching means adapted to enable said second coils when said advance signal is applied thereto, the operation of said second coils effectively disabling the operation of said first coils to thereby produce said second timing characteristic.

20. A system as defined in claim 19 wherein said switching means including a SCR connected in series with each of said second coils, the gate of each of said SCRs being connected to receive said advance signal and switch said SCRs into conduction.

21. A system as defined in claim 18 wherein said second timing characteristic is advanced approximately 10 rotational degrees relative to said first timing characteristic.

22. A system as defined in claim 18 wherein said operating speed signal producing means comprises a frequency to voltage convertor having an input operatively connected to a tachometer associated with the engine that is adapted to provide pulses at a frequency proportional to the operating speed of the engine, said convertor producing a voltage at an output having a magnitude that is proportional to the frequency of tachometer pulses that are applied to the input thereof.

23. A system as defined in claim 22 wherein said ignition capacitor charging disabling means includes second switching means connected in parallel across said ignition capacitor and adapted to shunt said ignition capacitor to prevent charging thereof when switched on, and first comparator means being adapted to receive said engine operating speed indicating signal and said second engine temperature signal, said first comparator means having its output operatively connected to said second switching means and adapted to switch on the same in response to receiving said second engine temperature signal or an engine operating speed signal indicative of said speed exceeding said second predetermined level.

24. A system as defined in claim 23 including an opto SCR comprising a light emitting diode (LED) connected to a temperature sensing switch adapted to switch into conduction and energize said LED when the sensed engine temperature exceeds said second predetermined level, said LED being optically coupled to a light sensitive SCR to switch said SCR on when said LED is energized, said SCR being connected to the reference terminal of said first comparator and providing a first reference voltage thereto when nonconducting and a second lower reference voltage when conducting.

25. A system as defined in claim 24 wherein said first comparator means has a reference voltage terminal and a comparing terminal, said reference voltage terminal having a lower reference voltage applied thereto when said light sensitive SCR is conducting, said comparing terminal being connected to said convertor output.

26. A system as defined in claim 18 wherein said advance signal generating means comprises a switching semiconductor having an output connected to each of said first switching means and adapted to switch on the same when said switching semiconductor is switched on.

27. A system as defined in claim 26 wherein said enabling signal producing means comprises a delay means and a second comparator means having first and second inputs, and an output operatively connected to said switching semiconductor, the first input having a reference voltage applied thereto, and the second input being connected to said delay means and to a means for producing said first engine temperature signal, said second comparator producing said enabling signal for said predetermined time period or for the duration of the receipt of the first engine temperature signal.

28. A system as defined in claim 27 wherein said second comparator means is an OR gate producing a high output as long as said second input is high, said second input being high for at least said predetermined time period and until said first engine temperature signal is no longer present.

29. A system a defined in claim 27 wherein said delay means comprises a capacitor connected to be charged by a starter solenoid through a diode, said capacitor being connected to said second input of said second comparator means through a resistor, said capacitor providing a high voltage to said second input until discharged sufficiently to switch said comparator means after said predetermined delay.

30. A system as defined in claim 27 wherein said inhibiting signal producing means comprises:
a third comparator having two inputs and an output, one of said inputs being connected to a reference voltage, the other input being operatively connected to said convertor, the output being connected to one input of an AND gate means, said third comparator producing a high output signal until said convertor applies a high signal at said other input indicating the engine operating speed has exceeded said first predetermined speed, and
an AND gate means having at least two inputs and an output, said output being connected to said switching semiconductor, one of said inputs being connected to the output of said second comparator means, the other of said inputs being connected to the output of said third comparator means, said AND gate switching off said switching semiconductor when one or more of said inputs is low.

31. In an internal combustion engine of the type which has an ignition system with an ignition capacitor means, a means to charge said capacitor means, an ignition capacitor discharge means connected to discharge said capacitor means, a starter having a starter solenoid, a battery for supplying power to the starter, control circuitry including a power supply having an output for controlling the operation of the ignition system, and a stator coil connected to the power supply for providing power to the control circuitry for the ignition system, the improvement comprising means for connecting the starter solenoid with the output of the power supply to provide supplemental power during startup.

32. The improvement as defined in claim 31 wherein the connecting means includes at least one diode connected between the starter solenoid and the output of the power supply.

33. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:
trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;
means for selectively generating an advance signal for application to said trigger pulse generating means; and,
means for producing an enabling signal for application to said advance signal generating means to generate said advance signal for a predetermined time period after startup of the engine, and also for generating said enabling signal in response to a first engine temperature signal being received, said first engine temperature signal being produced in response to the engine temperature not exceeding a first predetermined sensed level.

34. An ignition system for an internal combustion engine o type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means, said advance signal generating means producing said advance signal responsive to an enabling signal being received, but being precluded from producing said advance signal responsive to an inhibiting signal being received;

means for producing an enabling signal for application to said advance signal generating means to generate said advance signal for a predetermined time period after startup of the engine, and also for producing said enabling signal in response to a first engine temperature signal being received, said first engine temperature signal being produced in response to the engine temperature not exceeding a first predetermined sensed level;

means for producing an engine operating speed signal indicative of the speed of the engine; and, means for generating an inhibit signal in response to an engine speed signal indicative of an engine operating speed exceeding a first predetermined speed being received.

35. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means, said advance signal generating means producing said advance signal responsive to an enabling signal being received;

means for producing an enabling signal for application to said advance signal generating means to generate said advance signal for a predetermined time period after startup of the engine, and also for producing said enabling signal in response to a first engine temperature signal being received, said first engine temperature signal being produced in response to the engine temperature not exceeding a first predetermined sensed level;

means for producing an engine operating speed signal indicative of the speed of the engine;

means for disabling the ignition capacitor charging means in response to an ignition capacitor disabling signal being received;

means for producing an ignition capacitor disabling signal in response to an engine speed signal indicating an operating speed exceeding a second predetermined level being produced.

36. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means, said advance signal generating means producing said advance signal responsive to an enabling signal being received, but being precluded from producing said advance signal responsive to an inhibiting signal being received;

means for producing an enabling signal for application to said advance signal generating means to generate said advance signal in response to a first engine temperature signal being received, said first engine temperature signal being produced in response to the engine temperature not exceeding a first predetermined sensed level;

means for producing an engine operating speed signal indicative of the speed of the engine;

means for generating an inhibit signal in response to an engine speed signal indicative of an engine operating speed exceeding a first predetermined speed being received;

means for disabling the ignition capacitor charging means in response to an ignition capacitor disabling signal being received;

means for producing an ignition capacitor disabling signal in response to an engine speed signal indicating an operating speed exceeding a second predetermined level being produced.

37. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating mean being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means said advance signal generating means producing said advance signal responsive to an enabling signal being received, but being precluded from producing said advance signal responsive to an inhibiting signal being received;

means for producing an enabling signal for application to said advance signal generating means to generate said advance signal for a predetermined time period after startup of the engine;

means for producing an engine operating speed signal indicative of the speed of the engine;

means for generating an inhibit signal in response to an engine speed signal indicative of an engine operating speed exceeding a first predetermined speed being received;

means for disabling the ignition capacitor charging means in response to an ignition capacitor disabling signal being received;

means for producing an ignition capacitor disabling signal in response to an engine speed signal indicating an operating speed exceeding a second predetermined level being produced.

38. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means, said advance signal generating means producing said advance signal responsive to an enabling signal being received;

means for producing an enabling signal for application to said advance signal generating means to generate said advance signal for a predetermined time period after startup of the engine, and also for producing said enabling signal in response to a first engine temperature signal being received, said first engine temperature signal being produced in response to the engine temperature not exceeding a first predetermined sensed level;

means for producing an engine operating speed signal indicative of the speed of the engine;

means for disabling the ignition capacitor charging means in response to an ignition capacitor disabling signal being received;

means for producing an ignition capacitor disabling signal in response to a second engine temperature signal being produced in response to the engine temperature exceeding a second predetermined sensed level.

39. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to s id trigger pulse generating means, said advance signal generating means producing said advance signal responsive to an enabling signal being received;

means for producing an enabling signal for application to said advance signal generating means to generate said advance signal for a predetermined time period after startup of the engine, and also for producing said enabling signal in response to a first engine temperature signal being received, said first engine temperature signal being produced in response to the engine temperature not exceeding a first predetermined sensed level;

means for producing an engine operating speed signal indicative of the speed of the engine;

means for disabling the ignition capacitor charging means in response to an ignition capacitor disabling signal being received;

means for producing an ignition capacitor disabling signal in response to a second engine temperature signal being produced in response to the engine temperature exceeding a second predetermined sensed level and in response to an engine speed signal indicating an operating speed exceeding a second predetermined level being produced.

40. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means, said advance signal generating means producing said advance signal responsive to an enabling signal being received, but being precluded from producing said advance signal responsive to an inhibiting signal being received;

means for producing an enabling signal for application to said advance signal generating means to generate said advance signal in response to a first engine temperature signal being received, said first engine temperature signal being produced in response to the engine temperature not exceeding a first predetermined sensed level;

means for producing an engine operating speed signal indicative of the speed of the engine;

means for generating an inhibit signal in response to an engine speed signal indicative of an engine operating speed exceeding a first predetermined speed being received;

means for disabling the ignition capacitor charging means in response to an ignition capacitor disabling signal being received;

means for producing an ignition capacitor disabling signal in response to a second engine temperature signal being produced in response to the engine temperature exceeding a second predetermined sensed level and in response to an engine speed signal indicating an operating speed exceeding a second predetermined level being produced.

41. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means, said advance signal generating means producing said advance signal responsive to an enabling signal being received, but being precluded from producing said advance signal responsive to an inhibiting signal being received;

means for producing an enabling signal for application to said advance signal generating means to generate said advance signal for a predetermined time period after startup of the engine;

means for producing an engine operating speed signal indicative of the speed of the engine;

means for generating an inhibit signal in response to an engine speed signal indicative of an engine operating speed exceeding a first predetermined speed being received;

means for disabling the ignition capacitor charging means in response to an ignition capacitor disabling signal being received;

means for producing an ignition capacitor disabling signal in response to a second engine temperature signal being produced in response to the engine temperature exceeding a second predetermined sensed level and in response to an engine speed signal indicating an operating speed exceeding a second predetermined level being produced.

42. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means, said advance signal generating means producing said advance signal responsive to an enabling signal being received;

means for producing an enabling signal for application to said advance signal generating means to generate said advance signal for a predetermined time period after startup of the engine;

means for producing an engine operating speed signal indicative of the speed of the engine;

means for disabling the ignition capacitor charging means in response to an ignition capacitor disabling signal being received;

means for producing an ignition capacitor disabling signal in response to a second engine temperature signal being produced in response to the engine temperature exceeding a second predetermined sensed level and in response to an engine speed signal indicating an operating speed exceeding a second predetermined level being produced.

43. An ignition system for an internal combustion engine of the type which has an ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a first timing characteristic for discharging said ignition capacitor means and a second timing characteristic that is advanced a predetermined time with respect to said first timing characteristic, said trigger pulse generating means providing said second timing characteristic in response to an advance signal being applied thereto;

means for selectively generating an advance signal for application to said trigger pulse generating means;, said advance signal generating means producing said advance signal responsive to an enabling signal being received, but being precluded from producing said advance signal responsive to an inhibiting signal being received;

means for producing an enabling signal for application to said advance signal generating means to generate said advance signal in response to a predetermined operating condition:

means for producing an engine operating speed signal indicative of the speed of the engine;

means for generating an inhibit signal in response to an engine speed signal indicative of an engine operating speed exceeding a first predetermined speed being received;

means for disabling the ignition capacitor charging means in response to an ignition capacitor disabling signal being received;

means for producing an ignition capacitor disabling signal in response to a second engine temperature signal being produced in response to the engine temperature exceeding a second predetermined sensed level and in response to an engine speed signal indicating an operating speed exceeding a second predetermined level being produced.

44. An ignition system for an internal combustion engine of the type which has a ignition capacitor means, a means to charge said ignition capacitor means and an ignition capacitor discharge means connected to discharge said ignition capacitor means in response to receiving a trigger pulse applied thereto, the system comprising:

trigger pulse generating means for producing trigger pulses in synchronism with the engine speed, said trigger pulse generating means being adapted to provide a timing characteristic for discharging said ignition capacitor means;

means for producing an engine operating speed signal indicative of the speed of the engine;

means for disabling the ignition capacitor charging means in response to an ignition capacitor disabling signal being received; and, means for producing an ignition capacitor disabling signal in response to an engine temperature signal being produced in response to the engine temperature exceeding an upper predetermined sensed level and in response to an engine speed signal indicating an operating speed exceeding an upper predetermined level being produced.

* * * * *

UNITED STATES PATENT AND TRADEMARK OFFICE
CERTIFICATE OF CORRECTION

PATENT NO. : 4,858,585

DATED : August 22, 1989

INVENTOR(S) : Gregry M. Remmers

It is certified that error appears in the above-identified patent and that said Letters Patent is hereby corrected as shown below:

Column 9, line 19, change "herein" to --wherein--.

Column 11, line 56, change "a" to --as--.

Column 12, line 63, change "o" to --of the--.

Signed and Sealed this

Twenty-sixth Day of March, 1991

Attest:

HARRY F. MANBECK, JR.

Attesting Officer

Commissioner of Patents and Trademarks